(12) United States Patent
Eisenhour

(10) Patent No.: US 10,259,288 B2
(45) Date of Patent: Apr. 16, 2019

(54) POWER RECOVERY SYSTEM FOR A VEHICLE

(71) Applicant: Nissan North America, Inc., Franklin, TN (US)

(72) Inventor: Ronald Eisenhour, West Bloomfield, MI (US)

(73) Assignee: Nissan North America, Inc., Franklin, TN (US)

( * ) Notice: Subject to any disclaimer, the term of this patent is extended or adjusted under 35 U.S.C. 154(b) by 410 days.

(21) Appl. No.: 14/504,090

(22) Filed: Oct. 1, 2014

(65) Prior Publication Data
US 2016/0096411 A1 Apr. 7, 2016

(51) Int. Cl.
*B60H 3/00* (2006.01)
*B60H 1/00* (2006.01)
*B60H 1/22* (2006.01)

(52) U.S. Cl.
CPC ............... *B60H 1/00428* (2013.01); *B60H 2001/00178* (2013.01); *B60H 2001/2275* (2013.01); *Y02T 10/88* (2013.01)

(58) Field of Classification Search
CPC ........ B60H 1/00; B60H 3/00; B60H 1/00428; B60H 2001/00178; B60H 2001/2275; B60H 1/2225; B60H 1/2221; B60H 1/0005; B60H 1/00007; F25B 21/02; F25B 21/04; F25B 2321/021; F25B 2321/025; F25B 2321/02; F25B 165/42; F24F 2013/227; F24F 2013/225; F24F 2013/222; F24F 5/0042

See application file for complete search history.

(56) References Cited

U.S. PATENT DOCUMENTS

| | | | |
|---|---|---|---|
| 4,355,518 A | 10/1982 | Beitner | |
| 7,240,494 B2 | 7/2007 | Akei et al. | |
| 7,363,766 B2 | 4/2008 | Eisenhour | |
| 2005/0263176 A1 | 12/2005 | Yamaguchi et al. | |

(Continued)

FOREIGN PATENT DOCUMENTS

| | | | | |
|---|---|---|---|---|
| DE | 10235601 A1 * | 8/2003 | ........... | B60H 1/2203 |
| DE | 10235601 A1 * | 8/2003 | ........... | B60H 1/2203 |
| WO | 2009-006918 A1 | 1/2009 | | |

OTHER PUBLICATIONS

U.S. Appl. No. 14/483,820; Battery Charging Module for a Vehicle; N.Phan; filed Sep. 11, 2014.

*Primary Examiner* — Keith M Raymond
*Assistant Examiner* — Kamran Tavakoldavani
(74) *Attorney, Agent, or Firm* — Global IP Counselors, LLP

(57) ABSTRACT

A power recovery system for a heating, ventilation and air conditioning system of a vehicle includes an air handling system flow path, and a heater core disposed in a first flow path in fluid communication with the air handling system flow path. A heat sink is disposed in a second flow path in fluid communication with the air handling system flow path. A cooling circuit supplies a cooling fluid to the heat sink through the second flow path. A thermoelectric device has a first surface in thermal contact with the heater core and a second surface in thermal contact with the heat sink. The thermoelectric device converts a temperature difference between the first and second surfaces to electrical power.

20 Claims, 4 Drawing Sheets

(56) References Cited

U.S. PATENT DOCUMENTS

| | | | | |
|---|---|---|---|---|
| 2009/0000309 A1* | 1/2009 | Hershberger | ........... | F25B 21/02 |
| | | | | 62/3.5 |
| 2009/0000310 A1 | 1/2009 | Bell et al. | | |
| 2010/0287952 A1 | 11/2010 | Goenka | | |
| 2012/0079836 A1* | 4/2012 | Oh | ..................... | B60H 1/00428 |
| | | | | 62/3.3 |
| 2012/0247126 A1* | 10/2012 | Murase | ............. | B60H 1/00478 |
| | | | | 62/3.3 |
| 2012/0305044 A1* | 12/2012 | Zykin | ..................... | H01L 35/32 |
| | | | | 136/201 |
| 2013/0192272 A1* | 8/2013 | Ranalli | ................... | F25B 21/04 |
| | | | | 62/3.3 |
| 2013/0327063 A1 | 12/2013 | Gawthrop | | |
| 2014/0034103 A1* | 2/2014 | Kellie | ..................... | H01L 35/32 |
| | | | | 136/201 |
| 2014/0157803 A1* | 6/2014 | Pebley | ................... | F25B 41/00 |
| | | | | 62/89 |
| 2014/0209697 A1* | 7/2014 | Kaiser | ................... | F25B 29/00 |
| | | | | 237/55 |

* cited by examiner

POWER RECOVERY SYSTEM FOR A VEHICLE

BACKGROUND

Field of the Invention

The present invention generally relates to a power recovery system for a vehicle. More specifically, the present invention relates to a power recovery system for a heating, ventilation and air conditioning system of a vehicle.

Background Information

A power recovery system in a vehicle can include a thermoelectric device to generate electrical power through a temperature potential between opposing sides of the thermoelectric device. To efficiently generate electrical power, a large temperature potential is required. The stability of the temperature potential in a vehicle is often insufficient, such that maintaining the temperature potential is difficult. Additional pumps and fans may be used to avoid degradation of the temperature potential. However, electrical power is required to operate the additional devices to maintain the temperature potential, thereby diminishing the net benefit of the electrical power generated by the thermoelectric device. Furthermore, installing the additional devices to facilitate maintaining the temperature potential increases the expense of the power recovery system.

Accordingly, a need exists for a power recovery system for a vehicle in which a temperature potential is substantially maintained at the thermoelectric device.

SUMMARY

In view of the state of the known technology, one aspect of the present invention includes a power recovery system for a heating, ventilation and air conditioning system of a vehicle. A heater core is disposed in a first flow path in fluid communication with an air handling system flow path. A heat sink is disposed in a second flow path in fluid communication with the air handling system flow path. A cooling circuit supplies a cooling fluid to the heat sink through the second flow path. A thermoelectric device has a first surface in thermal contact with the heater core and a second surface in thermal contact with the heat sink. The thermoelectric device converts a temperature difference between the first and second surfaces to electrical power.

Another aspect of the present invention includes a power recovery system for a heating, ventilation and air conditioning system of a vehicle including a thermoelectric device having a first surface and a second surface, an evaporator, a heater core and a heat sink. The heater core is in thermal contact with the first surface of the thermoelectric device. The heater core receives hot engine coolant. The heat sink is in thermal contact with the second surface of the thermoelectric device. The heat sink is in fluid communication with the evaporator to receive a cooling fluid therefrom. The thermoelectric device converts a temperature difference between the first and second surfaces to electrical power.

Yet another aspect of the present invention includes a method of recovering power with a heating, ventilation and air conditioning system of a vehicle. Heat is supplied from a heater core to a first surface of a thermoelectric device. A cooling fluid is supplied to a second surface of the thermoelectric device. A temperature differential created between the first and second surfaces of the thermoelectric device is converted to electrical energy with the thermoelectric device.

BRIEF DESCRIPTION OF THE DRAWINGS

Referring now to the attached drawings which form a part of this original disclosure.

DETAILED DESCRIPTION OF EXEMPLARY EMBODIMENTS

Selected exemplary embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Figure 4:
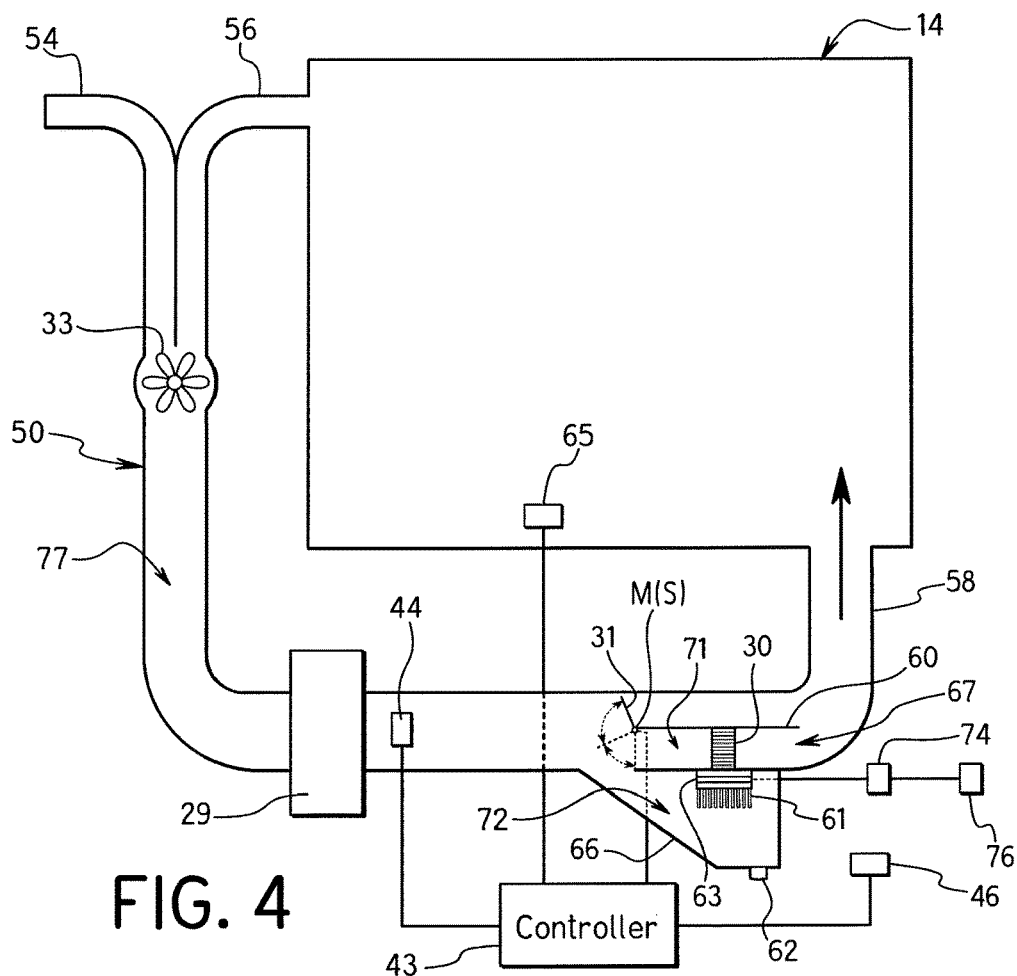
FIG. 4 is a schematic illustration of an energy harvesting system in the vehicle of FIG. 1 in accordance with an exemplary embodiment of the present invention.
Figure 5:
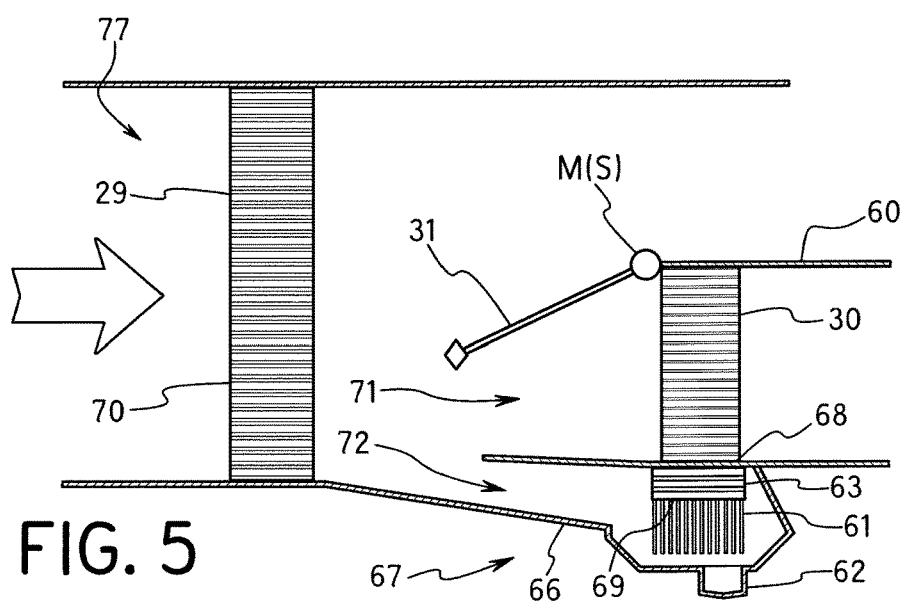
FIG. 5 is an enlarged schematic illustration of a thermoelectric device of the energy harvesting system of FIG. 4.

A power recovery system 67 for a heating, ventilation and air conditioning system of a vehicle includes a heater core 30, a heat sink 61 and a thermoelectric device 63, as shown in FIGS. 4 and 5. The heater core 30 is disposed in a first flow path 71 in fluid communication with an air handling system flow path 77. The heat sink 61 is disposed in a second flow path 72 in fluid communication with the air handling system flow path 77. A cooling circuit supplies a cooling fluid to the heat sink 61 through the second flow path 72. The thermoelectric device 63 has a first surface 68 in thermal contact with the heater core 30, and a second surface 69 in thermal contact with the heat sink 61. The thermoelectric device 63 converts a temperature difference between the first surface 68 and the second surface 69 to electrical power.

Figure 1:
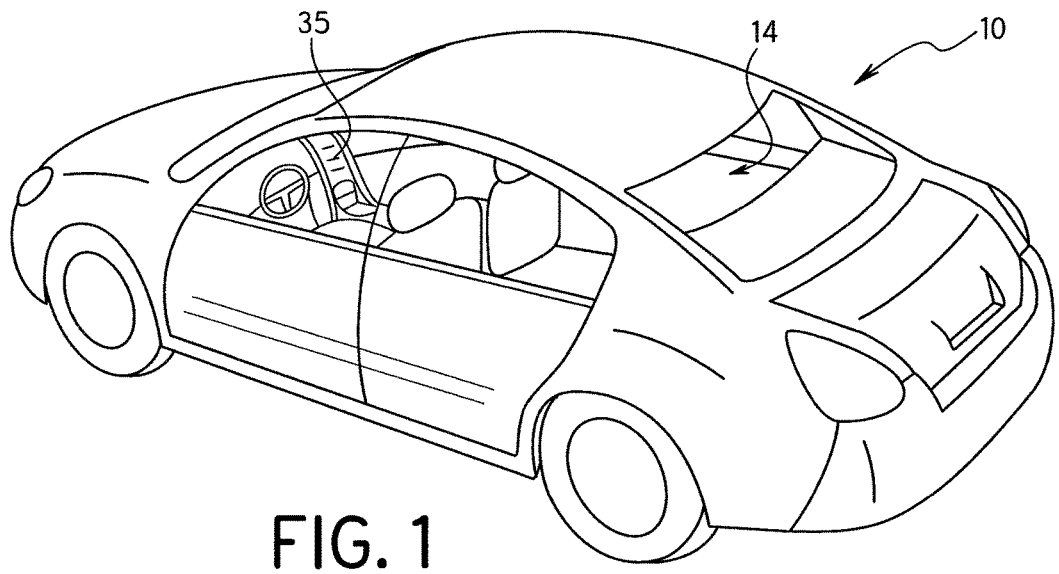
FIG. 1 is a perspective view of a vehicle.
Figure 2:
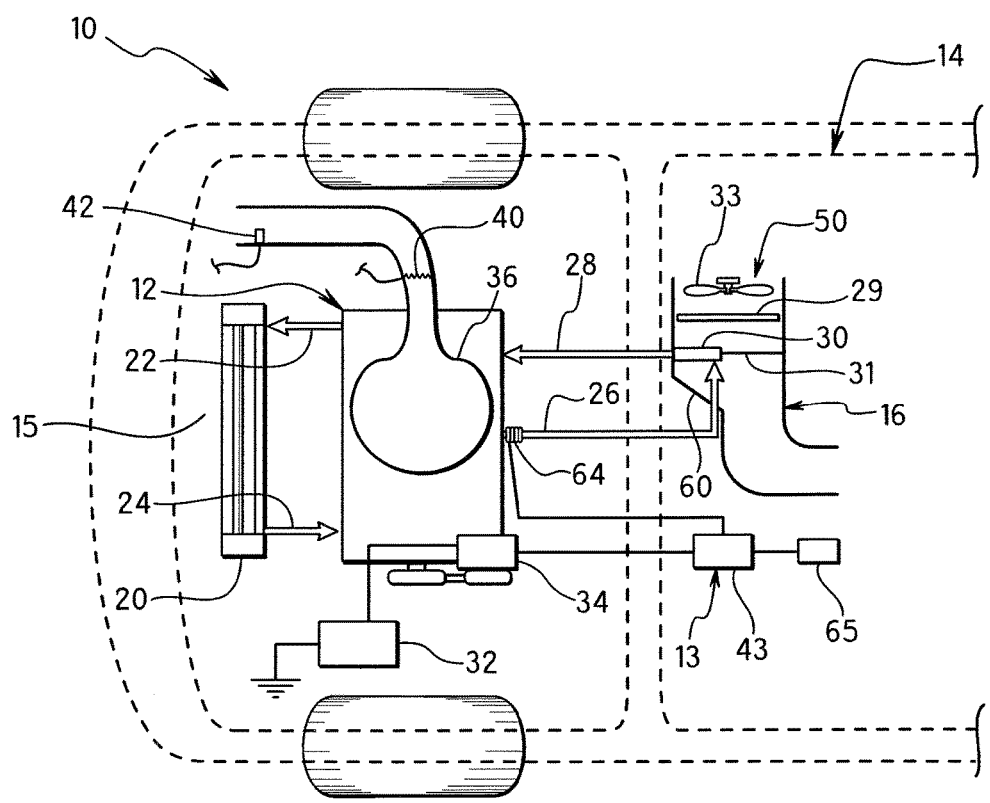
FIG. 2 is a schematic view of a heating system of the vehicle of FIG. 1.
Figure 3:
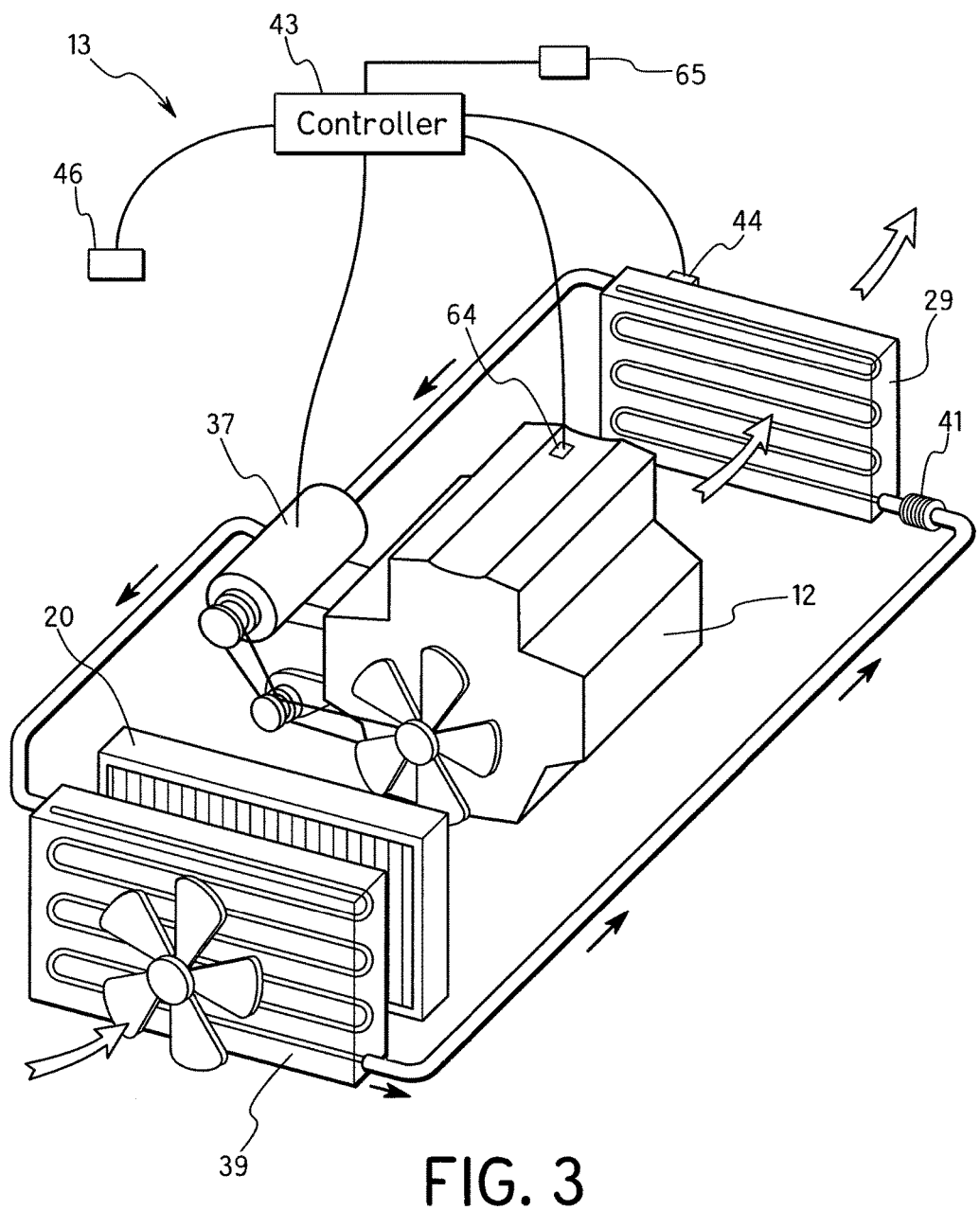
FIG. 3 is a schematic illustration of a cooling system of the vehicle of FIG. 1.

Referring initially to FIGS. 1-3, a vehicle 10 is illustrated in accordance with exemplary embodiments of the present invention. The vehicle 10 includes a heating system 16 (FIG. 2), a cooling system 13 (FIG. 3), a passenger compartment 14 (FIG. 1) with windows 17 (FIG. 1) and an engine 12 (FIG. 2). The vehicle 10 also includes a variety of additional features and components that are omitted from this description for the sake of brevity.

The engine 12 is installed within an engine compartment 15 of the vehicle 10, as shown in FIG. 2. The engine 12 can be any of a variety of hydrocarbon fueled engines, such as a gasoline powered internal combustion engine, a natural gas powered engine, or a diesel engine. Alternatively, the engine 12 can be a hybrid engine with the combination of an electric motor and a hydrocarbon fueled engine. The engine 12 includes, among other elements, a cooling system 13 having a radiator 20 for dissipating excess heat, coolant hoses 22, 24, 26 and 28, and a heater core 30 that is also a part of the heating system 16 of the vehicle 10.

As shown in FIG. 2, the coolant hoses 22 and 24 connect the radiator 20 with the engine 12 such that coolant can selectively circulate between the engine 12 and the radiator 20. The coolant hoses 26 and 28 connect the heater core 30 to the engine 12 such that coolant can selectively circulate between the engine 12 and the heater core 30. It should be understood from the drawings and the description herein that the engine 12 includes a thermostat or other coolant flow restricting device such that coolant flow between the engine 12 and the radiator 20 is controlled. Specifically, the thermostat (not shown) prevents the flow of coolant between the engine 12 and the radiator 20 when the engine 12 is cold (when the engine 12 is below a predetermined operating temperature).

It should also be understood from the drawings and the description herein that the engine 12 and/or heating system 16 can include a heater valve (not shown) that can control the flow of coolant circulating between the engine 12 and the heater core 30. However, such a heater valve is not required for practicing the invention, as is apparent from the description below.

The engine 12 also includes a battery 32, an alternator 34 and an air intake assembly 36. The battery 32 is provided for starting the engine 12 and providing backup electric power to the vehicle 10 in a conventional manner. The battery 32 is supplied with electricity (for recharging) by the alternator 34. The alternator 34 is further configured to supply electric power to electric powered equipment within the vehicle 10 when the engine 12 is running.

The air intake assembly 36 can have any of a variety of differing configurations and functions. For example, in some engine configurations the air intake assembly 36 can have a simple configuration in which air is directed through an air filter prior to the air entering the engine 12 for combustion. In other engine configurations, the air intake assembly 36 can include, for example, an air flow metering device used in combination with a fuel injection system. Specifically, the air intake assembly 36 is not limited to any one configuration or function. For the purposes of the invention described herein, the only required function of the air intake assembly 36 is to direct air into the engine 12 for combustion with a hydrocarbon fuel or other manufactured or processed fuel that requires air for combustion. The air intake assembly 36 can be provided with an air intake heater 40 and an air intake temperature sensor 42. The air intake temperature sensor 42 is configured to measure an air intake temperature of the combustion air entering the engine 12. The air intake heater 40 is configured to heat the combustion air entering the engine 12.

The passenger compartment 14 includes many conventional elements, such as an instrument panel, seats and driving controls, whose description is omitted for the sake of brevity. The instrument panel includes a control panel 35 that is operated by a passenger within the vehicle 10 to control operation of the heating system 16 and the cooling system 13, as is described in greater detail below.

The heating system 16 of the vehicle 10 includes an air handler 50. The air handler 50 is shown schematically in FIGS. 2 and 4 along with an air conditioning evaporator 29, an air flow control door 31, a blower 33, the control panel 35 and the heater core 30. The heating system 16 is configured to provide heat to the passenger compartment 14 of the vehicle 10 using heat transferred from the engine 12 to the coolant circulating through the engine 12. The arrangement shown in FIGS. 2 and 4 is a functional depiction that shows the various elements installed within the air handler 50. For example, the air conditioning evaporator 29, the air flow control door 31, the blower 33 and the heater core 30 are all disposed within the air handler 50. The relative positions of the various elements within the air handler 50 can be changed and/or re-arranged for the specific design of the vehicle 10, and is not limited to the schematic depiction in FIGS. 2 and 4.

The air handler 50 can be an air duct or a series of air ducts that directs air from outside the vehicle 10 (in a fresh air mode) and/or recirculates air from within the passenger compartment 14 (in a recirculation mode) back into the air handler 50 in a conventional manner. The air handler 50 includes an air handler flow path 77. Because the basic operations of an air handler 50 are conventional, further description is omitted for the sake of brevity.

The air flow control door 31 is a hinged member that is movable between a heat enabled position (shown as a solid line in FIG. 4) and a heat disabled position (shown as a vertical dashed line in FIG. 4). More specifically, the air flow control door 31 is movable between the heat enabled position and the heat disabled position to control the amount of heat added to air flowing through the air handler 50, as shown in FIGS. 2, 4 and 5. For example, when the air flow control door 31 is in the heat enabled position, all air passing through the air handler 50 contacts heat transferring surfaces or heating surfaces of the heater core 30. When heat is available from coolant circulating through the heater core 30, the air flowing by the heater core 30 is heated. When the air flow control door 31 is in the heat disabled position, the air passing through the air handler 50 is prevented from passing along heat transferring surfaces of the heater core 30. Although the air flow control door 31 is described as being a hinged member, the air flow control door can be any movable member suitable for controlling the amount of heat added to air flowing through the air handler 50, such as a shutter.

In the depicted exemplary embodiment, the air flow control door 31 includes a motor M and a position sensor S, as shown in FIGS. 4 and 5. The motor M can be a vacuum controlled positioning device, or an electric motor. The sensor S provides feedback to a controller 43 (described further below) such that the controller 43 controls the position of the air flow control door 31. Both the motor M and the positioning sensor S are connected to the controller 43, as is described in greater detail below. Alternatively, the motor M can be replaced with a conventional cable connected to the air flow control door 31. The cable (not shown) is also connected to a control mechanism included in the control panel 35. When the control mechanism, such as a lever, is manipulated by the passenger, the amount of air flowing across heat transfer surfaces of the heater core 30 is adjusted in a conventional manner. The positioning sensor S can be included in the embodiment with the cable to sense the position of the air flow control door 31.

The blower 33 is provided to force air through the air handler 50. A speed of the blower 33 is controlled by the settings on the control panel 35 within the passenger compartment 14. Because the blower 33 is a conventional element, further description is omitted for the sake of brevity. The control panel 35 includes control elements that allow the passenger within the passenger compartment 14 to control operation of the heating system 16 and the cooling or air conditioning system 13. The control panel 35 is connected to the controller 43, and is manipulated by the passenger(s) to control operation of the cooling and heating systems 13 and 16, the air flow control door 31 and the blower 33.

The air temperature sensor 50 is positioned within the passenger compartment 14 and is connected to the controller 43. The function of the air temperature sensor 50 is described further herein below.

The coolant temperature sensor 64 can be located in any of a variety of locations. For example, the coolant temperature sensor 64 can be on or within the engine 12 to measure the temperature of the coolant circulating through the engine 12. Alternatively, the coolant temperature sensor 64 can be located within the heater core 30 or one of the coolant hoses 26 and 28, as shown in FIG. 2. The coolant temperature sensor 64 measures coolant temperature of the coolant that provides heat to the heater core 30 and hence provides heat to the passenger compartment 14, once excess heat from the engine 12 is available. The coolant temperature sensor 64 is connected to the controller 43 providing signals that represent the temperature of the coolant circulating through the engine 12 and heater core 30.

As shown in FIG. 3, the cooling or air conditioning system 13 includes a compressor 37, a condenser 39, an expansion device 41, an evaporator 29 and a controller 43. The compressor 37 is configured to compress refrigerant. Operation of the compressor 37 is controlled by the controller 43, as described in greater detail below.

The compressor 37 is preferably powered by the engine 12 in a conventional manner, but can alternatively be powered by an electric motor (not shown) separate from the engine 12. The compressor 37 is fluidly connected to the condenser 39 and the evaporator 29 by refrigerant tubing in a conventional manner. The compressor 37 is configured to compress low pressure refrigerant received from the evaporator 29 and deliver high pressure refrigerant to the condenser 39.

It should be understood from the drawings and description herein that the compressor 37 can be any of a variety of types of compressors. For example, the compressor 37 can include a clutch mechanism (not shown) that is controlled by the controller 43, such that the controller 43 manages operation of the compressor 37 by cycling the clutch between an engaged orientation (compressor on) and a disengaged orientation (compressor off). Hence, with this compressor 37 configuration, the controller 43 manages the operation of the compressor 37 by cycling the compressor 37 on and off.

The condenser 39 is fluidly coupled to the compressor 37 to receive the compressed refrigerant from the compressor 37 and dissipate heat therefrom in a conventional manner. The expansion device 41 is configured to throttle the refrigerant, allowing it to expand, thereby reducing the pressure of the refrigerant as the refrigerant enters the evaporator 29. The evaporator 29 is fluidly coupled to the condenser 39 via the expansion device 41 to receive the expanded refrigerant from the condenser 39. The evaporator 29 is further configured to cool or absorb heat from air provided to the passenger compartment 14 and is further fluidly coupled to the compressor 37 to supply the refrigerant to the compressor 37. The compressor 37, the condenser 39, the expansion device 41 and the evaporator 29 are preferably conventional devices fluidly connected to one another by conventional high and low pressure refrigerant lines. Consequently, description of these conventional devices is omitted for the sake of brevity.

As shown in FIGS. 3 and 4, the air conditioning system 13 also includes the blower 33, a temperature sensor 44, an ambient temperature sensor 46, the coolant temperature sensor 64 (FIGS. 2 and 3), the air flow control door 31, and a passenger compartment temperature sensor 65. The controller 43 is operably connected to each of the temperature sensor 44, the ambient temperature sensor 46, the air flow control door 31, and the passenger compartment temperature sensor 65.

The blower 33, as shown in FIG. 4, is configured to draw air from outside the vehicle 10 via duct 54 and air from the passenger compartment 14 via duct 56. A door (not shown) can block or restrict outside air from entering via the duct 54.

The blower 33 is further configured to move air along the heat exchanging surfaces of the evaporator 29 in a conventional manner. The blower 33 is operated by a fan switch (not shown) that is adjusted by a vehicle passenger or can alternatively be controlled by the controller 43 (e.g., via an automatic climate control mode). The air force generated by the blower 33 further causes air to move past the temperature sensor 44, toward the air flow control door 31 and toward the heater core 30 (depending upon the orientation of the air flow control door 31) and further through a duct 58 back to the passenger compartment 14, as indicated in FIG. 4.

The temperature sensor 44 is preferably positioned at a downstream side of the evaporator 29 (relative to the direction of air blown by the blower 33) between the evaporator 29 and the heater core 30. More specifically, the temperature sensor 44 is located downstream from the evaporator 29 and upstream from the heater core 30. The temperature sensor 44 is configured to detect the temperature of cooled air that contacts the cooling surfaces of the evaporator 29. The temperature sensor 44 can be positioned on the evaporator 29 or can be spaced apart from the evaporator 29, as shown in FIG. 4. Preferably, the temperature sensor 44 is positioned close to or proximate the evaporator 29. Preferably, the temperature sensor 44 is positioned to measure the temperature at the evaporator 29, at all speeds of the operation of the blower 33. The temperature sensor 44 is connected to the controller 43 so that the controller 43 can continuously monitor the temperature of air that is cooled by the evaporator 29.

The ambient temperature sensor 46 is preferably located on the vehicle 10 such that the ambient or outdoor temperature (outside the vehicle 10) is measured. The ambient temperature sensor 46 is therefore preferably located outside of the passenger compartment 14.

The air flow control door 31 is preferably located downstream from the evaporator 29 at the opening of a duct 60 that houses the heater core 30. The duct 60 forms a heater core flow path 71, which is in fluid communication with the air handler flow path 77. The heater core 30 is a conventional element that is provided with heated coolant from the engine 12, as shown in FIG. 2, or an alternative heat source, in a conventional manner. The air flow control door 31 is a movable member that is configured to selectively divert a predetermined amount of the air cooled by the evaporator 29 and pass that portion of cooled air toward the heater core 30. Alternatively, as noted above, any suitable mechanism for diverting, or blending, the flow of air from the evaporator 29 to the heater core 30 can be used, such as shutters. The air contacting the heating surfaces of the heater core 30 is heated and then mixes with the cooled air in the duct 58 prior to entering the passenger compartment 14. The air flow control door 31 can be moved such that all of the air from the evaporator 29 contacts the heating surfaces of the heater core 30 (the position of the air flow control door 31 shown in a solid line in FIG. 4), such as when heat is required in the passenger compartment 14.

The air flow control door 31, the duct 60 and the heater core 30 define an air mixing assembly. Mixing of air by control of the position of the air flow control door 31 provides a means for ensuring that the passenger compartment 14 is maintained at the requested outlet temperature when the air conditioning system 13 is operating. The air flow control door 31 can include a conventional positioning device (not shown), such as an electric stepper motor, that is operated by the controller 43.

The passenger compartment temperature sensor 65 is connected to the controller 43 and provides a measurement of the temperature in the passenger compartment 14. The passenger compartment temperature sensor 65 is preferably located within the passenger compartment 14 but can alternatively be located in, for example, the duct 56, measuring the temperature of air drawn out of the passenger compartment 14.

The controller 43 can employ an air blending adjustment logic that manages the transitions of the evaporator temperature to maintain a target outlet temperature from the duct 58 entering the passenger compartment 14. The logic used by the controller 43 minimizes the amount of air contacting cooling surfaces of the evaporator 29 that is reheated by the heater core 30. The logic used by the controller 30 strives to minimize the amount of air that the air flow control door 31 diverts toward the heater core 30. Consequently, the air mixing assembly (the air flow control door 31, the duct 60 and the heater core 30) is configured to selectively divert a minimal portion of the air passing by the evaporator 29 to the heater core 30. The controller 43 is operatively coupled to the air mixing assembly to control an amount of the air cooled by the evaporator 29 that is diverted toward the heater core 30 to attain a predetermined temperature range within the passenger compartment 14.

The cooled air that passes by the evaporator 29 has a portion of its moisture content removed during the process of being cooled by the evaporator 29. A portion of the moisture in the air condenses on the surfaces of the evaporator 29 and is drained out of the vehicle 10 through a drain 62 in a conventional manner.

The power recovery system 67 in accordance with an exemplary embodiment of the present invention includes the heater core 30, a heat sink 61 and a thermoelectric device 63, as shown in FIGS. 4 and 5. The thermoelectric device 63 has a first surface 68 in thermal contact with the heater core 30, and a second surface 69 in thermal contact with the heat sink 61. Preferably, the second surface 69 is opposite the first surface 68.

The first surface 68 is in thermal contact with the heater core 30, which, as described above, receives heated coolant from the engine 12 (FIGS. 2 and 3). The heated coolant from the engine 12 provides heat to the first surface 68 of the thermoelectric device 63 of approximately 80° C. Accordingly, the first surface 68 of the thermoelectric device 63 provides a hot side thereof. When the air flow control door 31 is positioned in a heating mode (e.g., position shown as a solid line in FIG. 4) such that heat is transferred to the airflow by the heater core 30, the temperature of the coolant that feeds the first surface (i.e., the hot side) 68 of the thermoelectric device 63 may become slightly cooler (e.g., approximately 5° C. cooler). When the air flow control door 31 is positioned in a full cooling mode (e.g., position shown as a vertical dashed line in FIG. 4) such that the duct 60 forming the heater core flow path 71 is substantially blocked, the airflow heat loss of the heater core 30 is substantially eliminated, such that the temperature potential of the thermoelectric device 63 is not degraded.

The second surface 69 is in thermal contact with the heat sink 61. As described above, when the air conditioning system is running condensation from the evaporator 29 flows through a discharge passage 66 before reaching the condensate drain 62, as shown in FIG. 5. The discharge passage 66 provides a heat sink flow path 72, which is in fluid communication with the air handler flow path 77. The discharge passage 66 is disposed downstream of the evaporator 29 and has a downward slope such that gravity facilitates discharge of the condensation. With this configuration, the heat sink 61 is at least partially disposed vertically below cooling surfaces 70 of the evaporator 29. The heat sink 61 is disposed in the discharge passage 66 such that the condensation contacts the heat sink 61 before discharging through the drain 62. Additionally, a portion of the air cooled by the evaporator 29 when the air conditioning system 13 is operating flows through the discharge passage 66. Thus, the condensation and cooled air contacting the heat sink 61 provides the second surface 69 of the thermoelectric device 63 as a cool side. The heat sink 61 is subjected to a temperature of approximately 5° C. when the air conditioning system 13 is operating, which maintains the temperature of the second surface 69 of the thermoelectric device 63.

When the air conditioning system 13 is not operating, ambient air is drawn in through duct 54 from outside the vehicle 10. A portion of the ambient air flows through the discharge passage 66 and out through the drain 62, as shown in FIGS. 4 and 5. The ambient air flowing through the discharge passage 66 facilitates maintaining the cool side of the thermoelectric device 63 in the absence of condensation when the air conditioning system 13 is not being operated. The temperature of the heat sink 61 when the air conditioning system 13 is not being operated can vary with the outside temperature, humidity, and speed and airflow of the blower 33. For example, the heat sink 61 can be at extremely low temperatures in the winter, such as −20° C. Thus, the cooling fluid supplied to the heat sink includes water condensation, cooling air from the evaporator 29 and ambient air drawn from outside the vehicle 10. Accordingly, a temperature differential at the thermoelectric device 63 is maintained both when the air conditioning system 13 is being operated and when the air conditioning system 13 is not being operated.

As shown in FIGS. 4 and 5, the heater core flow path 71 and the heat sink flow path 72 are separate flow paths such that air contacting the heating surfaces of the heater core 30 does not contact the heat sink 61 before exiting the air handler 50. Thus, the temperature of the heat sink 61 is not increased by the heated air from the heater core 30.

The thermoelectric device 63 creates power through a temperature differential between the first and second surfaces 68 and 69. The temperature differential between the first surface (hot side) 68 of the thermoelectric device 63 and the second surface (cold side) 69 ranges from between 50 to 120° C. depending on operating conditions (e.g., condensation, ambient air or a combination thereof contacting the heat sink 61). The generated electrical power is generally proportional to the temperature difference. Accordingly, the thermoelectric device 63 in accordance with exemplary embodiments of the present invention maintains the temperature difference across the first and second surfaces 68 and 69 to provide an efficient thermoelectric device 63.

Figure 6:
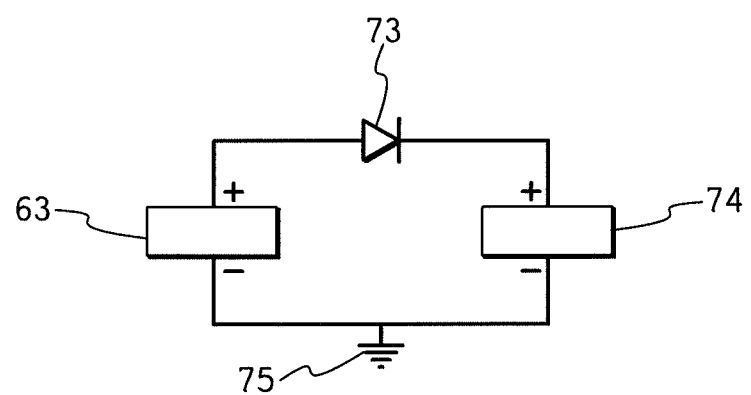
FIG. 6 is an electrical circuit illustrating charging of a storage battery by the energy harvesting system of FIG. 4.

As shown in FIGS. 4 and 6, the thermoelectric device 63 can be electrically connected to a storage battery 74. The charging circuit, as shown in FIG. 6, includes a diode 73, which allows flow of electrical current only in the direction from the thermoelectric device 63 to the storage battery 74. The thermoelectric device 63 and the storage battery 74 are connected to electric ground 75. The diode 73 allows electrical current to flow from the thermoelectric device 63 to the storage battery 74 when the voltage is high enough, which is determined by the diode 73 being used. The thermoelectric device 63 maintains the charge of the storage battery 74 with electrical power generated by the temperature differential between the first and second surfaces 68 and 69 of the thermoelectric device 63. The storage battery 74 can supply power to accessories 76, such as LEDs. Alternatively, the thermoelectric device can be connected to the main battery 32 to replenish the charge thereof.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the power recovery system.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A power recovery system for a heating, ventilation and air conditioning system of a vehicle, comprising:
    an air handling system flow path;
    a heater core disposed in a first flow path in fluid communication with the air handling system flow path, fluid flowing through the first flow path being supplied to a passenger compartment of the vehicle;
    a heat sink disposed in a second flow path in fluid communication with the air handling system flow path, the second flow path being different from the first flow path;
    a cooling liquid supplied to the heat sink through the second flow path, the cooling liquid flowing through the second flow path not being supplied to the passenger compartment of the vehicle; and
    a thermoelectric device having a first side in thermal contact with the heater core and a second side in thermal contact with the heat sink, the thermoelectric device converting a temperature difference between the first surface and the second surface to electrical power.

2. The power recovery system according to claim 1, wherein
    an evaporator is disposed upstream of the thermoelectric device.

3. The power recovery system according to claim 2, wherein
    the cooling liquid is water condensation from the evaporator.

4. The power recovery system according to claim 2, further comprising
    an airflow contacting cooling surfaces of the evaporator being supplied to the heat sink.

5. The power recovery system according to claim 4, wherein
    a blower moves air into contact with the evaporator to generate the airflow.

6. The power recovery system according to claim 1, wherein
    hot engine coolant contacting heating surfaces of the heater core supplies heat to the first side of the thermoelectric device.

7. The power recovery system according to claim 1, wherein
    a drain is disposed adjacent the heat sink through which the cooling liquid is discharged.

8. The power recovery system according to claim 3, wherein
    the heat sink is disposed vertically lower than cooling surface of the evaporator such that gravitational forces urge generated condensation to the heat sink.

9. The power recovery system according to claim 1, wherein
    a battery is connected to the thermoelectric device to receive the electrical power from the thermoelectric device.

10. A power recovery system for a heating, ventilation and air conditioning system of a vehicle, comprising:
    a thermoelectric device having a first surface and a second surface;
    an evaporator;
    a heater core in thermal contact with the first surface of the thermoelectric device, the heater core receiving hot engine coolant and being in fluid communication with the evaporator, fluid flowing through the heater core being supplied to a passenger compartment of the vehicle; and
    a heat sink in thermal contact with the second surface of the thermoelectric device, the heat sink being in fluid communication with the evaporator to receive a cooling liquid therefrom, the cooling liquid from the evaporator flowing through the heat sink not being supplied to the passenger compartment of the vehicle,
    the thermoelectric device converting a temperature difference between the first surface and the second surface to electrical power.

11. The power recovery system according to claim 10, wherein
    the cooling liquid is water condensation from the evaporator.

12. The power recovery system according to claim 10, further comprising
    an airflow contacting cooling surfaces of the evaporator being supplied to the heat sink.

13. The power recovery system according to claim 12, wherein
 a blower moves air into contact with the evaporator to generate the airflow.

14. The power recovery system according to claim 10, wherein
 a drain is disposed adjacent to the heat sink through which the cooling liquid is discharged.

15. The power recovery system according to claim 10, wherein
 the heater core is disposed in a first flow path and the heat sink is disposed in a second flow path, such that the heat sink is not subjected to heated air from the heater core.

16. A method of recovering power with a heating, ventilation and air conditioning system of a vehicle, comprising the steps of
 supplying heat by thermal contact from a heater core to a first surface of a thermoelectric device, fluid flowing through the heater core being supplied to the passenger compartment of the vehicle;
 supplying a cooling liquid from an evaporator to a second surface of the thermoelectric device, the cooling liquid not being supplied to the passenger compartment of the vehicle;
 converting the temperature differential created between the first and second surfaces of the thermoelectric device to electrical energy with the thermoelectric device.

17. The method of recovering power of according to claim 16, wherein
 the heat is supplied from hot engine coolant contacting heating surfaces of the heater core.

18. The method of recovering power according to claim 16, wherein
 the cooling liquid is water condensation from the evaporator.

19. The method of recovering power according to claim 16, further comprising
 supplying an airflow contacting cooling surfaces of the evaporator to the second surface of the thermoelectric device.

20. The method of recovering power according to claim 16, further comprising
 supplying the electrical energy from the thermoelectric device to a battery.

* * * * *